March 16, 1971     H. J. LANFRANKIE     3,570,034
CAR WASHING APPARATUS
Filed Feb. 26, 1969                                                    3 Sheets-Sheet 1
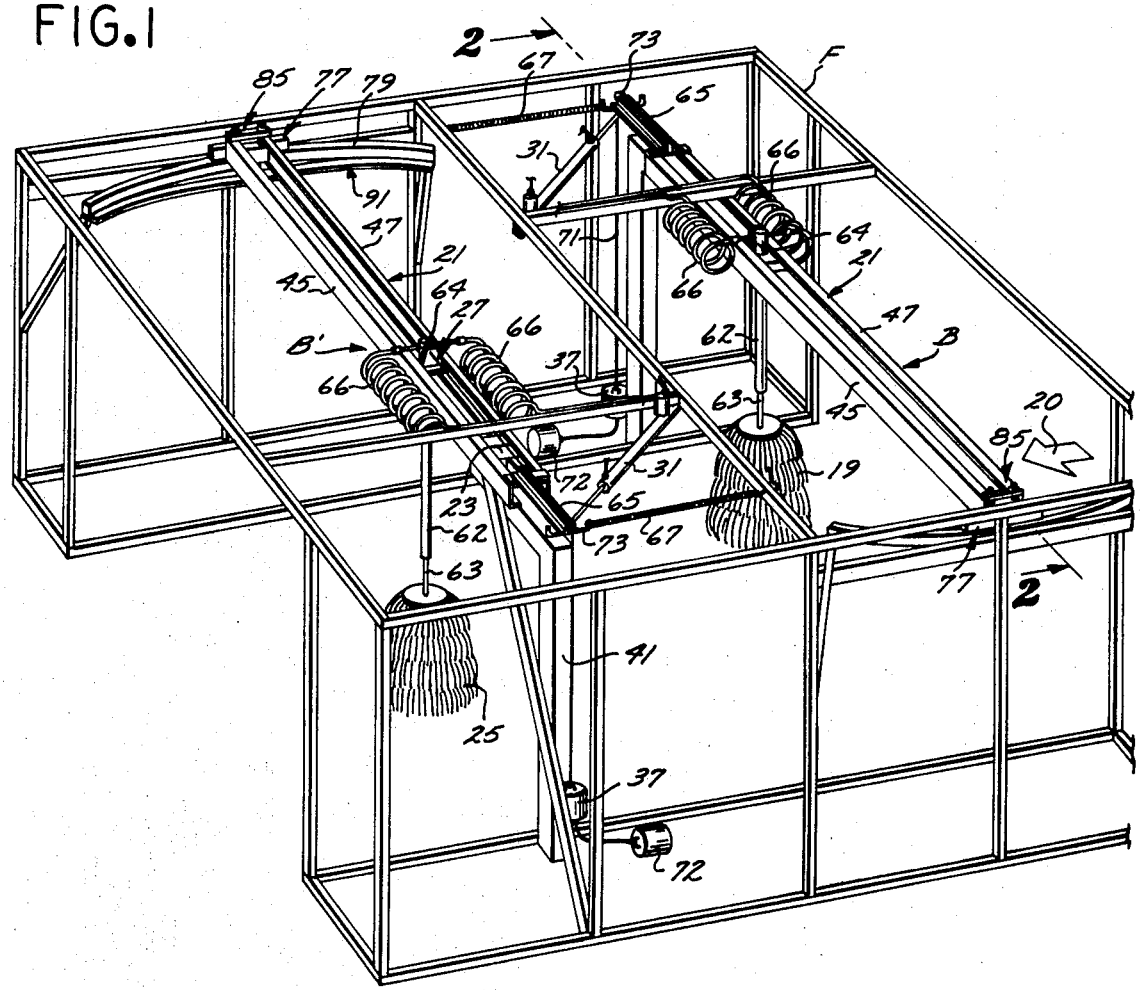
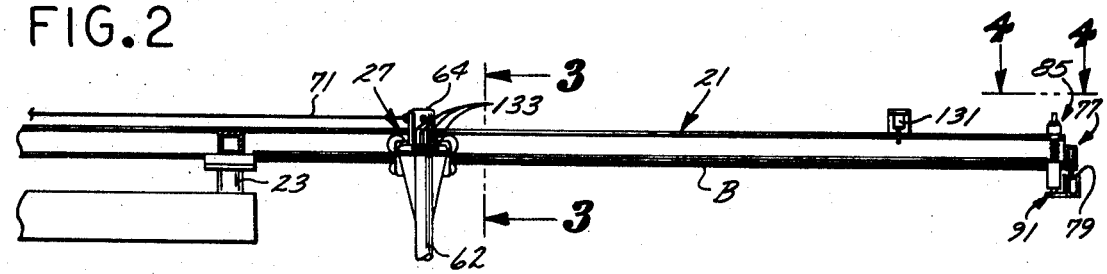
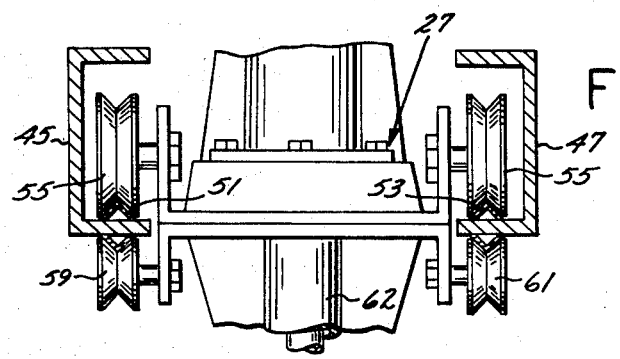
INVENTOR.
HENRY J. LANFRANKIE
BY *Fulwider, Patton, Rieber,*
*Lee and Utecht*
ATTORNEYS March 16, 1971 H. J. LANFRANKIE 3,570,034
CAR WASHING APPARATUS
Filed Feb. 26, 1969 3 Sheets-Sheet 2
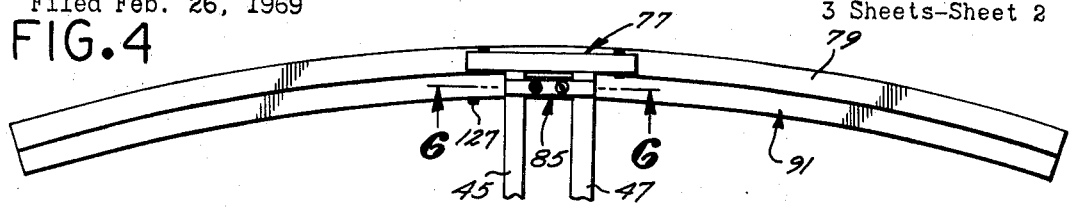
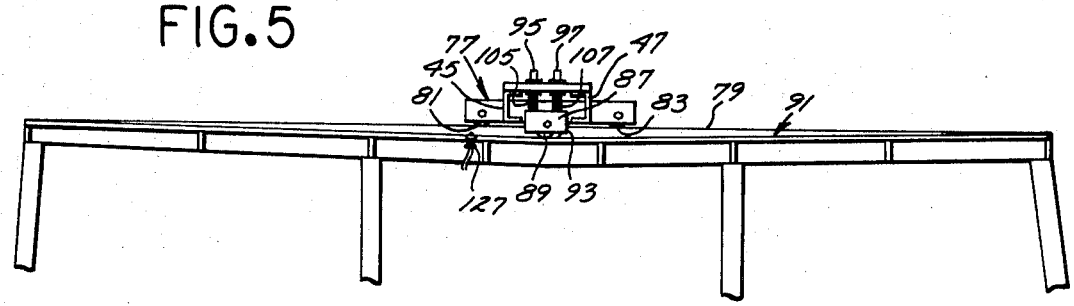
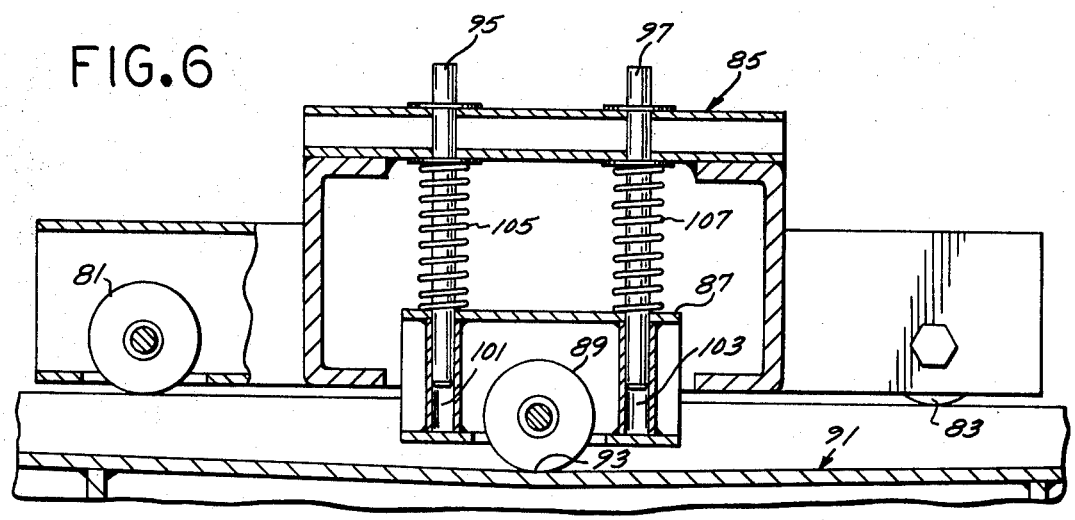
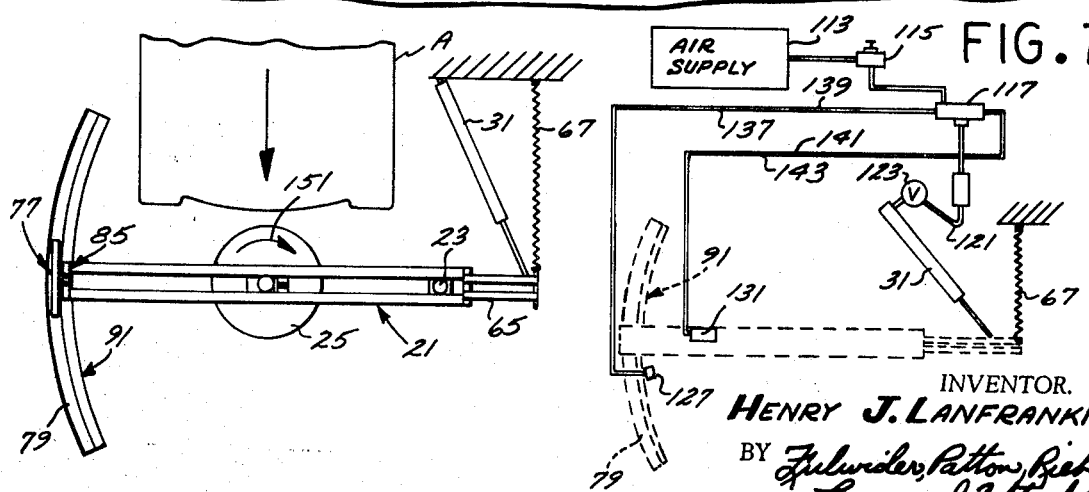
INVENTOR.
HENRY J. LANFRANKIE
BY Fulwider, Patton, Rieber, Lee and Utecht
ATTORNEYS INVENTOR.
HENRY J. LANFRANKIE
BY Fulwider, Patton, Rieber,
Lee and Utecht
ATTORNEYS United States Patent Office 3,570,034
Patented Mar. 16, 1971

3,570,034
CAR WASHING APPARATUS
Henry J. Lanfrankie, Glendale, Calif., assignor to
California Car Wash, Sun Valley, Calif.
Filed Feb. 26, 1969, Ser. No. 802,515
Int. Cl. B60s 3/06
U.S. Cl. 15—21                                    12 Claims

ABSTRACT OF THE DISCLOSURE

A car washing apparatus for washing a car as it passes along a predetermined path, such apparatus comprising an overhead arm pivotally mounted at one side of the path and normally extending transversely thereover. The arm forms a track which mounts a carriage that suspends a rotary vertical brush. Means is provided for biasing the arm to its normal position projecting transversely of the path and control means is provided to pivot said arm from its neutral position to a rearward position. The carriage is biased to a normal position disposing said brush centrally in the path. Thus, an automobile moving forwardly along the path will contact the brush and swing the arm forwardly and urge the brush outwardly along the track to the front corner of the automobile. The bias means will then swing the arm rearwardly moving the brush along the side of the car to the neutral position where the control means will effect further rearward movement thereof to the rear corner of the car and then the arm will commence forward movement and the brush will move inwardly along the rear of the car to its central position while the arm moves forwardly to its neutral position.

BACKGROUND OF THE INVENTION

Field of the invention

The present invention relates to car washing apparatus.

Description of the prior art

Many existing car washing apparatus include an overhead arm assembly comprising a primary arm normally extending transversely of the automobile path and a secondary arm normally extending longitudinally of the automobile path and mounting a vertical rotary brush on its free end. In order to operate properly, such apparatus must include a relatively elaborate series of hydraulic control cylinders having various valving and flow control devices associated therewith for controlling movement of the arms. A car washing apparatus of this type is shown in U.S. Pat. No. 3,350,733. Devices of this type are not completely satisfactory since the forwardly projecting arm occupies considerable space thus necessitating a relatively large area for installation of a car washing apparatus. Also, the control components required for proper operation of the device are relatively expensive to purchase and require frequent maintenance and replacement. Further, the brushes frequently catch on forward projections at the front of certain automobiles and upon continued forward travel of the auto, spring loose and rebound into the side of the auto doing damage thereto.

SUMMARY OF THE INVENTION

The car washing apparatus of present invention is characterized by a pair of like overhead arms each having one end pivotally mounted at the side of the path of a car to be washed and normally projecting transversely over such path. A track is mounted on the arm supports a carriage from which is suspended a rotary vertical brush for normal disposition centrally in the path. An arm biasing means biases the arm to its normal position projecting transversely of the path and a control means pivots the arm from a forward position to a rearward position. A biasing means also biases the brush to its normal position centrally of the car path. Thus, a car traveling along the path will engage the brush of each arm and cause each arm to swing forwardly while the brushes move laterally relative to the sides of the car. The control means then commences swinging the arms rearwardly to move the brushes along either side of the care and when each such brush reaches the rear corner of the car, it will commence swinging forwardly to its neutral position while the brush is drawn inwardly along the track to wash the rear of the car.

An object of the present invention is to provide a car wash apparatus which requires a comparatively small amount of space for installation and operation.

Another object of the present invention is to provide a car wash apparatus of the type described which employs relatively few components to thereby reduce installation costs and maintenance expenses.

A further object of the present invention is to provide a car wash apparatus of the type described which is convenient to operate and includes a brush which closely follows the contour of the automobile being washed without catching on projections of such contour.

These objects and advantages of the present invention will become apparent from a consideration of the following detailed description when taken in conjunction with the accompanying drawings.

DESCRIPTION OF THE DRAWINGS

FIG. 1 is a perspective view of a car washing apparatus embodying the present invention;

FIG. 2 is a vertical sectional view, in enlarged scale, taken along the line 2—2 of FIG. 1;

FIG. 3 is a vertical sectional view, in enlarged scale, taken along the line 3—3 of FIG. 2;

FIG. 4 is a partial plan view, in enlarged scale, of an arcuate support track included in the car washing apparatus shown in FIG. 1;

FIG. 5 is an elevational view of the track shown in FIG. 4;

FIG. 6 is a vertical sectional view, in enlarged scale, taken along the line 6—6 of FIG. 4;

FIG. 7 is a schematic of a control system which may be utilized with the car wash apparatus shown in FIG. 1; and FIGS. 8 through 13 are partial plan views, in reduced scale, of the car wash apparatus shown in FIG. 1 and depicting the apparatus in several different positions corresponding with progress of the automobile along its path.

DESCRIPTION OF THE PREFERRED EMBODIMENT

Figure 9:
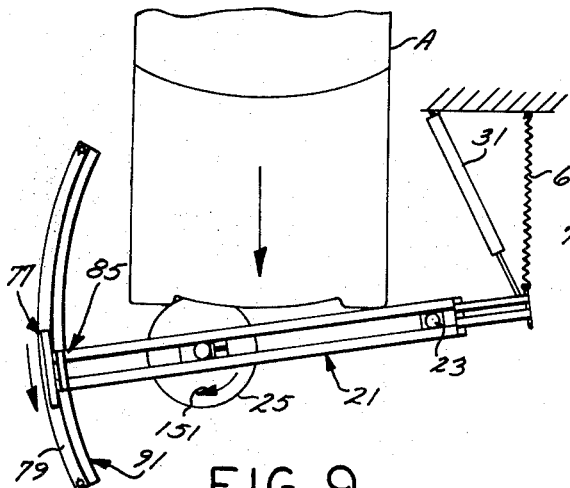
Figure 10:
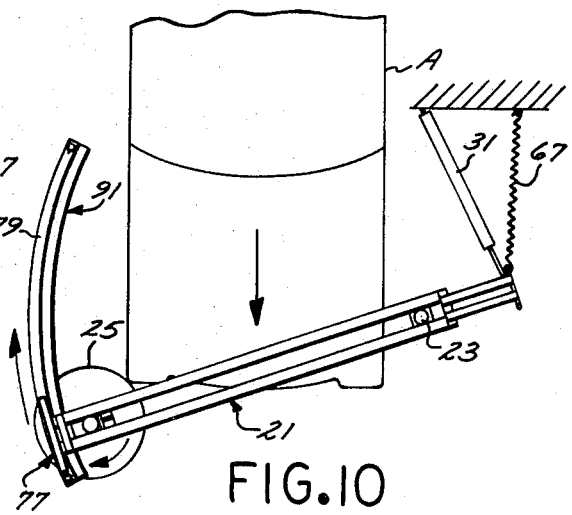
Figure 11:
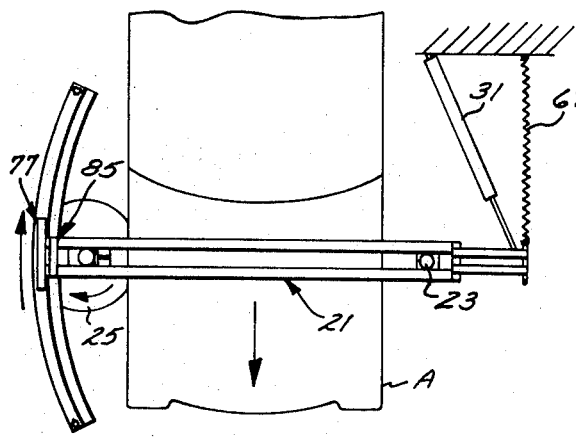
Figure 12:
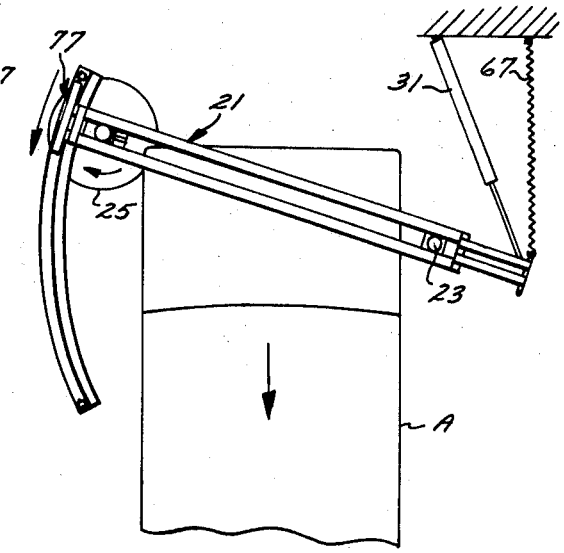

The car washing apparatus shown in FIG. 1 includes a pair of opposite hand brush mechanisms B and B' for washing the left and right hand sides, respectively, of an automobile A as it moves along a predetermined path 20. The brush mechanism B comprises generally, an overhead arm 21 pivotally mounted at 23 and carrying a rotary vertical brush 25 from a radially moveable carriage 27. The arm 21 is biased to a normal position projecting transversely of the automobile path 20 and is connected with a control cylinder 31 which is operative, upon rearward swinging of such arm to its neutral position, to swing such arm further rearwardly to the position shown in FIG. 12. The carriage 27 is biased to a position disposing the brush 25 centrally in the path 20 by a counterweight 37. Thus, an automobile traveling along the path 20 will first encounter the brush mechanism B to wash the left side of the car, then the mechanism B' to wash the right side of the car. When the auto A contacts the brush 25 of the mechanism B', it will push the free end of the arm 21 forwardly as shown in FIG. 9 concurrently causing the brush 25 to move across the front of the car to the right hand side as shown in FIG. 10. The arm 21 will then return to its neutral position drawing the brush 25 along the side of the auto A and the cylinder 31 will then be operative to rotate the arm 21 rearwardly to the rear corner thereof as shown in FIG. 12. The cylinder 31 will then relieve and the arm 21 will commence forward motion while the brush 25 is drawn inwardly across the rear of the forwardly moving car until it again attains its normal position.

The arms 21 of the mechanism B and B' are pivoted from opposite sides of a framework F forming a central tunnel which defines the path 20. A support 41 is mounted at one side of the pathway 20 and carries the pivot joint 23. The arm 21 is formed by a pair of confronting channels 45 and 47 which mount inverted angles 51 and 53 along their lower flanges for receiving the support wheels 55 of the cariage 27. The carriage 27 includes a pair of retainer wheels 59 and 61 which engage respective angles on the bottom of the lower flanges of the channels 45 and 47 to hold such carriage captive against the rocking force imposed thereon by the force of an automobile striking the brush 25. The brush 25 is mounted from the carriage 27 by means of a hollow vertical shaft 62 having a drive shaft 63 projecting downwardly therethrough and driven by a pneumatic motor 64. Air is supplied to the motor 64 by pneumatic hoses 66.

Referring to FIGS. 1 and 8, the arm 21 includes a lever 65 which projects rearwardly of the pivot joint 23 and has a pair of coil tension springs 67 and 68 connected therewith for resisting pivoting of the arm 21 from its neutral position. The control cylinder 31 is likewise connected with the rear extremity of the lever 65.

Referring to FIGS. 1 and 2, the counterweight 37 is connected with the carriage 27 by means of a cable 71 which threads over a pulley 73 mounted on the rear extremity of the lever 65. A second counterweight 72 is carried on said cable 71 whereby the first weight 37 will resist movement of the brush 25 across the front of the car and the weight 72 will be raised about the time the front corner of the auto A is reached to apply a greater force to the brush to hold it firmly against the side of the auto.

Referring to FIGS. 1 and 4 through 6, the free end of the arm 21 is supported by a trolley, generally designated 77, carried on an arcuate support track 79 mounted from the frame F. Referring to FIG. 6, the trolley 77 includes a pair of wheels 81 and 83 which travel on the horizontal support track 79.

Still referring to FIGS. 4 and 6, supported from the arm 21 immediately inwardly from the trolley 77 is a homing device, generally designated 85. The homing device 85 includes a floating element 87 carried on a wheel 89 that travels along an arcuate control track 91. Referring to FIG. 5, the control track 91 angles downwardly from its opposite ends to an intermediate low point 93 corresponding with the normal position of the arm 21. The homing device 85 includes a pair of downwardly projecting pins 97 and 99 which are telescoped into upwardly opening vertical tubes 101 and 103 included in the floating element 87. The rods 95 and 97 are surrounded by coil springs 105 and 107, respectively, which press the floating element 87 downwardly to cause the wheel 89 to tend to run downhill on the control track 91 to the low point 93.

Referring to FIG. 7, the control system may include an air supply 113 connected with a regulator 115 which regulates air to fourway valve 117. The valve 117 controls pressure to the control cylinder 31 through a conduit 121 including a manual valve 123 therein. A one-way acting actuating valve 127 is included just forward of the low point 93 and is tripped by the arm 21 pivoting rearwardly thereby to actuate the fourway valve 117 and pressurize the cylinder 31. A de-actuating valve 131 is carried on the outer end of the arm 21 and a plurality of spring loaded, spaced-apart, pivotal fingers 133 (FIG. 2) project upwardly from the carriage and actuate such valve when the carriage commences inward travel, after the brush 25 clears the rear corner of the auto A, to thereby de-actuate the valve 117 and relieve pressure from the cylinder 31.

In operation, the car washing apparatus of present invention normally assumes the position shown in FIGS. 1 and 8. When pressure is applied to the drive motor 66 the brush is caused to rotate in the direction shown by the directional arrow 151 (FIG. 8) and when the front of the automobile A contacts such brush, the arm 21 will be swung forwardly as shown in FIG. 9 and the forward force of the automobile on the brush, coupled with the frictional resistance between the brush and automobile, will cause such brush to move radially outwardly along the arm 21. As the brush 25 approaches the right corner of the car the weight 72 will be lifted to bias the brush 25 firmly against the side of the car.

Figure 13:
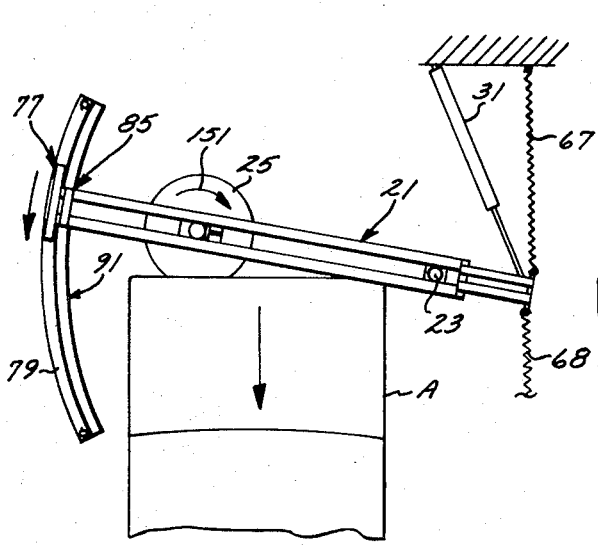

When the arm reaches the position shown in FIG. 10 with the brush at the front corner of the car, the spring 68 will commence rearward swinging of the arm 21 to move the brush 25 rearwardly along the right hand side of the car and such brush will be maintained against the side of a car by the weight of the counterweight 37. When the arm 21 approaches its normal position, the switch 127 will be actuated to apply pressure to the dead end of the cylinder 31 thus continuing rearward rotation of the arm 21 to the position shown in FIG. 12. When the arm 21 reaches the position shown in FIG. 12, the carriage 23 will commence inward travel along the arm 21 and one of the fingers 133 will engage the valve 131 to close the fourway valve 117 and exhaust pressure from the dead end of the cylinder 31 thus enabling the homing device 85 to urge the arm 21 forwardly to its normal position shown in FIG. 8. Concurrently the counterweight 37 pulls the brush radially inwardly along the arm to wash the rear of the automobile as shown in FIG. 13.

From the foregoing, it will be apparent that the car washing apparatus of present invention is sturdy in construction and economical to manufacture. The apparatus only requires sufficient longitudinal car path to enable the reltaively minor amount of forward and rearward swinging of the overhead arm thus substantially decreasing the length of car travel required for a complete washing. Further, there are no elaborate controls required to attain satisfactory brush operation and assure close brush following of the car contour.

Various modifications and changes may be made with regard to the foregoing detailed description without departing from the spirit of the invention.

I claim:

1. Car washing apparatus for washing an automobile as it moves along a predetermined path, said apparatus comprising:
   an overhead arm having one end pivotally mounted at one side of said path, normally extending transversely of said path, and pivotable between a forward position and a rearward position;
   arm control means for normally maintaining said arm in its normal position and for selectively pivoting said arm from said forward position to said rearward position;
   a carriage mounted on said arm;
   carriage bias means biasing said carriage to a neutral position disposed centrally in said path;
   a rotary vertical brush suspended from said carriage; and
   means for rotating said brush whereby a car moving along said predetermined path will contact said brush and push the free end of said arm forwardly causing said carriage to move outwardly along said arm until said brush reaches the front corner of said car, said control means then swinging said arm to said rearward position thereby moving said brush rearwardly along the side of said car to the rear corner thereof and enabling said brush to then move inwardly along said arm as said arm swings forwardly to its normal position to wash the rear of said car.

2. Car washing apparatus as set forth in claim 1 wherein:

said arm control means includes an arcuate control track supported adjacent the free end of said arm and formed to slope downwardly from both ends to a low point corresponding with the neutral position of said arm and a roller mounted on the free end of said arm for rolling on said track whereby the weight of the free end of said arm on said roller tends to cause said roller to roll to said low point.

3. Car washing apparatus as set forth in claim 1 wherein:

said means for rotating said brush rotates said brush in a direction that causes the frictional resistance between said brush and said car to tend to move said brush across the front of said car, rearwardly along the side thereof and inwardly across the rear thereof.

4. Car washing apparatus as set forth in claim 1 wherein:

said arm control means includes a fluid cylinder connected with said arm and an actuation switch disposed in the path of said arm for actuation thereby to apply pressure to one end of said cylinder and swing said arm rearwardly to said rearward position.

5. Car washing apparatus as set forth in claim 1 that includes:

an arcuate support track disposed at the other extremity of said arm; and a wheel mounted on the outer extremity of said arm for rolling along said support track.

6. Car washing apparatus as set forth in claim 1 wherein:

said arm control means includes a fluid cylinder connected with said arm and a first actuating valve disposed in the path of said arm near the normal position of said arm and actuated thereby on rearward swinging of said arm to pressurize one end of said cylinder to swing said arm to its rearward position.

7. Car washing apparatus as set forth in claim 1 wherein:

said carriage includes retaining wheels engaged with said arm to hold carriage captive on said arm.

8. Car washing apparatus as set forth in claim 1 wherein:

said arm control means includes bias means for normally maintaining said arm in said normal position.

9. Car washing apparatus as set forth in claim 1 wherein:

said carriage bias means applies a selected bias to said carriage while said brush moves across the front of said car and a second bias, greater than said selected bias, while said brush is moved rearwardly along the side of said car.

10. Car washing apparatus as set forth in claim 2 wherein:

said arm control means include a floating element mounting said wheel and biasing means for biasing said wheel downwardly against said control track.

11. Car washing apparatus as set forth in claim 6 wherein:

said arm control means includes a de-actuating valve responsive to said arm reaching said rearward position to relieve pressure from said cylinder to enable said cylinder to return to said normal position.

12. Car washing apparatus as set forth in claim 11 wherein:

said de-actuating valve is mounted on said carriage and an actuating finger is mounted on said carriage for engaging said de-actuating valve when said carriage commences inward travel along said arm.

References Cited

FOREIGN PATENTS 1,523,276   3/1968   France _____ 15—CCP

EDWARD L. ROBERTS, Primary Examiner